US006948078B2

(12) United States Patent
Odaohhara

(10) Patent No.: US 6,948,078 B2
(45) Date of Patent: Sep. 20, 2005

(54) BATTERY HAVING A PLURALITY OF TEMPERATURE SENSORS FOR OUTPUTTING DIFFERENT CONTROL INFORMATION TO A CONNECTED COMPUTER SYSTEM BASED UPON THE TEMPERATURE RELATIONSHIPS OF THE SENSORS

(75) Inventor: Shigefumi Odaohhara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 10/015,812

(22) Filed: Nov. 2, 2001

(65) Prior Publication Data

US 2002/0079866 A1 Jun. 27, 2002

(30) Foreign Application Priority Data

Nov. 16, 2000 (JP) ........................................ 2000-350163

(51) Int. Cl.$^7$ ................................................. G06F 1/26
(52) U.S. Cl. ........................ 713/300; 713/310; 713/322; 713/324
(58) Field of Search ................................. 713/300, 310, 713/322, 324

(56) References Cited

U.S. PATENT DOCUMENTS 6,540,685 B1 * 4/2003 Rhoads et al. ............... 600/459
6,542,846 B1 * 4/2003 Miller et al. ................. 702/132

FOREIGN PATENT DOCUMENTS

EP 448755 A1 * 10/1991 ........... G01R/31/36

* cited by examiner

Primary Examiner—Chun Cao
Assistant Examiner—Nirav Amin
(74) Attorney, Agent, or Firm—John L. Rogitz

(57) ABSTRACT

A battery pack includes overcurrent limiting transistors and respective sensors in proximity to battery cell and the transistors. A CPU in the battery pack receives temperature signals from the sensors and selects an action to control temperature based on the temperature signals.

13 Claims, 7 Drawing Sheets

FIG. 5

| Thermal level | 5 | | 4 | | 3 | |
|---|---|---|---|---|---|---|
| Action | Power Off | | Suspend | | Throttling | |
| Location | enable | disable | enable | disable | enable | disable |
| TH1 | 65 degC | N/A | 60 degC | 52 degC | 55 degC | 50 degC |
| TH2 | 110 degC | N/A | 105 degC | 95 degC | 100 degC | 90 degC |
| TH3 | 55 degC | N/A | 50 degC | 42 degC | 45 degC | 40 degC |

| Thermal level | 2 | | 1 | | 0 | |
|---|---|---|---|---|---|---|
| Action | Clock down | | Rotate fan | | Normal state | |
| Location | enable | disable | enable | disable | enable | disable |
| TH1 | 53 degC | 48 degC | 50 degC | 40 degC | N/A | N/A |
| TH2 | 95 degC | 85 degC | 90 degC | 60 degC | N/A | N/A |
| TH3 | 42 degC | 38 degC | 38 degC | 35 degC | N/A | N/A |

FIG. 7
(a)
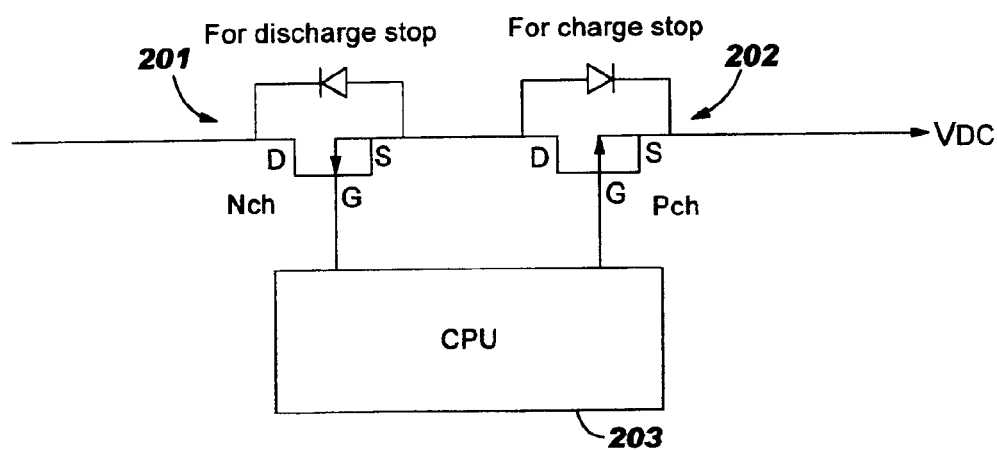
(b)
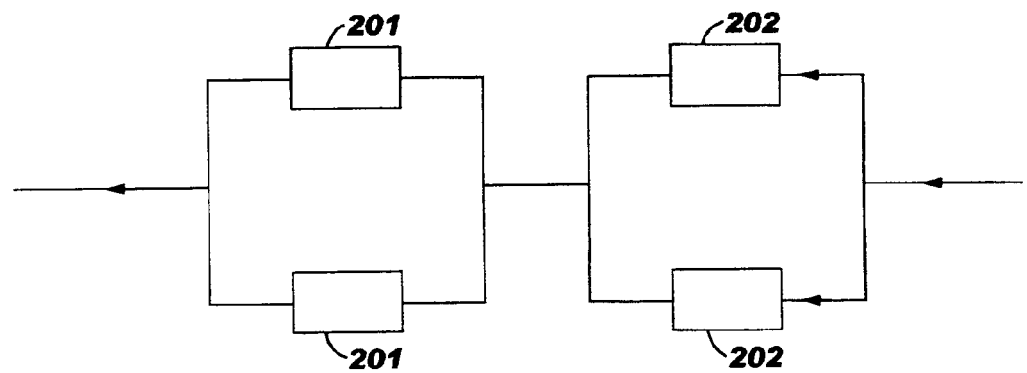

BATTERY HAVING A PLURALITY OF TEMPERATURE SENSORS FOR OUTPUTTING DIFFERENT CONTROL INFORMATION TO A CONNECTED COMPUTER SYSTEM BASED UPON THE TEMPERATURE RELATIONSHIPS OF THE SENSORS

FIELD OF THE INVENTION

The present invention relates to a method for controlling the temperature of a battery, or the like, and more specifically to a temperature control method or the like in which control is performed from the system side as the battery temperature rises.

BACKGROUND OF INVENTION

Recently, in electric equipment such as a personal digital assistant equipment represented by a notebook-sized personal computer (notebook PC), there has been a strong demand on the battery for thinning, saving weight, giving a large capacity as well as increasing the power consumption. The increase in the power consumption has caused a problem of heat generation in the battery pack constructed to be attachable to electric equipment and enclosing a battery.

In the conventional control method, only the temperature of the battery cell comprised of a nickel-cadmium battery (NiCd battery), nickel-hydrogen battery, lithium-ion battery, or lithium-polymer battery in the battery pack is detected, and the detected temperature is directly sent to the system unit. In the system unit having received the detected temperature, an approach has been taken, in which before a dangerous condition is reached, for instance, in a notebook PC, it is put in a suspend state (the power is cut while supplying power only to minimum hardware required for holding data, such as the CPU and memory, and keeping the program execution state) or the like, thereby to reduce the supply of power for keeping the battery cell at a specific temperature or lower.

Further, recently, the FET (Field Effect Transistor) is used in as protection circuits for battery cells such as lithium-ion battery cells.

FIG. 7(a) and FIG. 7(b) are figures for explaining the structure of the FET as the protection circuit. As shown in FIG. 7(a), for instance, there are provided a discharge stopping FET 201 and a charge stopping FET 202 for the battery cell as a protection circuit, and the protection of the battery cell is provided under control from a CPU 203. That is, discharging stops when the discharging stop FET 201 is turned off, and charging stops when the charge FET 202 is turned off, thereby enabling overcurrent, overcharging, and over-discharging for the battery cell to be prevented. In FIG. 7(a), the discharge stop FET 201 is made N-channel and the charge stop FET 202 is made P-channel, but they may both be made N-channel or P-channel.

In this case, if an FET as such protection circuit is provided, since a large current flows through the power line to which the FET is related, overheating of the FET has become a new problem. For instance, in the large-capacity DC/DC converter designed in a notebook PC, for instance, the input voltage (Vin) is about 16 V from the AC adapter or about 10 V from the battery voltage, and for instance, an output voltage (Vout) of about 1.6 V is supplied to the CPU on the system side (system unit CPU). In recent years, however, the load power of the CPU is tending to increase (for instance, 15 A to 20 A), causing a serious problem that the temperature of the FET becomes very high. Specifically, in the running of a special program for which the CPU operates at high speed, the temperature of the FET rises significantly and exceeds the absolute rated temperature, and as a result, the FET can be broken.

To handle such problems, for instance, as shown in FIG. 7(b), it is possible to take a measure in which two discharge stopping FETs 201 and charge stopping FETs 202 are provided in parallel, respectively. Since heating is effective in proportion to the square of the current flowing through the FET, the current flowing through one FET is halved by providing the FETs in parallel, thereby enabling the heating for one FET to be drastically reduced. That is, as shown in FIG. 7(b), by providing the respective FETs in parallel and in a plural number, it is possible to balance the current value and the temperature.

SUMMARY OF THE INVENTION

The present invention comprises temperature sensors in the portions of a battery which need a temperature control, and the CPU that is a controller within the battery collects the respective temperature information from the temperature sensors, compares them with a thermal table showing the relations between temperature rise suppressing measures and temperature conditions to determine an action, and sends the determined action level to the system side of the computer system. That is, the present invention is a battery connected to a computer system for supplying power to the computer system, having a first sensor provided at a first location in said battery for detecting temperature, a second sensor provided at a second location different location for detecting temperatures, and a CPU for outputting information on the action to be implemented by the computer system to the computer system according to the temperature detected by the first sensor and the temperature detected by the second sensor.

The above invention can be characterized in that, using a table showing the correspondence between the temperature conditions and the temperature rise suppressing measures, the CPU selects a predetermined state from a plurality of states to which the computer system can transition, according to the respective temperatures obtained by the first sensor and the second sensor, and outputs information on the selected predetermined state to the computer system. The temperature conditions can be set as different values for the first sensor and the second sensor.

Further, at least one of the first sensor and the second sensor can be provided at any location in proximity to a protection circuit for preventing an overcurrent, overcharging and over-discharging and a location in proximity to the surface of a cover for housing the battery in addition to a sensor for measuring temperature rises of the battery cell itself. This construction also enables the inside of the battery to be kept at an optimum temperature.

Further, action for reducing a temperature rise may include: decreasing the clock frequency of the system unit CPU in the computer system; intermittently operating the system unit CPU, a suspending CPU operation, and turning off the power totally. Furthermore, it is also possible to energize a fan to expel heat. These measures are preferably selected according to temperature heat levels.

Additionally, the battery pack of the present invention is a battery pack which is attached to an electric equipment (for instance, portable electric equipment), and characterized by comprising a cover forming a part of the outer wall of the electric equipment when the battery pack is attached to the electric equipment, an outer wall sensor for detecting the temperature in proximity to a predetermined location on the cover, memory means for presetting and storing the relations between the conditions for the temperature detected by the outer wall sensor and a plurality of temperature rise suppressing measures, process determination means for determining a temperature rise suppressing measure from the temperature detected by the outer wall sensor based on the relations stored in the memory means, and output means for outputting information on the temperature rise suppressing measure determined by the process determination means to the electric equipment.

The above battery pack is further characterized in that an internal temperature detecting sensor is further provided for detecting the temperature at a predetermined location comprised of a protection circuit or a battery cell in the battery pack, and including the conditions for the temperature detected by the internal temperature detecting sensor as conditions different from the conditions for the temperature detected by the outer wall sensor, the memory means presets and stores the relations between the conditions for these temperatures and the plurality of temperature rise suppressing measures, using, for example, a table.

Further, the present invention is a computer system constructed so that a battery pack for power supply can be attached to the system unit thereof, and characterized by comprising a cover forming a part of the outer wall in the computer system when the battery pack is attached to the computer system, temperature detecting means for detecting the temperature in proximity to a predetermined location on the cover forming a part of the outer wall, operation level selecting means for selecting a level of operation in the computer system according to the temperature detected by the temperature detecting means, and transmitting means for transmitting information on the level of operation selected by the operation level selecting means to the system unit, which operates according to the information transmitted from the battery pack.

The above invention can be characterized in that the system unit includes a CPU which functions as a brain of the computer system, and the operation level selecting means in the battery pack selects a first state of decreasing the clock frequency of the CPU and a second state of intermittently operating the CPU as the level of operation. Further, a state of suspending the computer system, a state of turning off the power, or a state of rotating a fan to suppress the temperature rise may be included.

In another aspect, the present invention is an electric equipment constructed so that a battery pack for power supply can be attached to the system unit thereof, and can be characterized by comprising a plurality of temperature detecting means provided for a plurality of locations in the battery pack to detect temperature in the portion in proximity to the provided locations, a measure selecting means for selecting the temperature rise suppressing measure of a specific stage from temperature rise suppressing measures of a plurality of stages, according to each temperature detected, and a suppressing measure implementing means for implementing the selected temperature rise suppressing measure. The above electric equipment includes, for instance, portable electric equipment or the like to which a battery pack can be attached as well as that represented by a notebook-sized personal computer.

Further, it can be characterized in that the measure selecting means determines stepwise temperature rise suppressing measures of lower to higher levels according to the temperature condition of each of the temperatures detected by the plurality of temperature detecting means, and if the temperature detected by at least one temperature detecting means of the plurality of temperature detecting means corresponds to the temperature condition of a stage at a level higher than the temperature rise suppressing measure of the current stage, it selects the temperature rise suppressing measure of the stage corresponding to that temperature condition. This construction allows an optimum measure to be installed according to the temperature condition of the electric equipment without installing an excessive temperature rise suppressing measure. Furthermore, it is preferable in the point that the danger of at least one of a plurality of portion reaching an abnormal state can be avoided.

Further, it can be characterized in that the measure selecting means selects any two or more of a measure for rotating a fan, a measure for decreasing the clock frequency of the CPU in the system unit, a measure for intermittently operating the CPU, a suspend measure, and a power-down measure in the system unit as stepwise temperature rise suppressing measures.

On the other hand, if it is characterized in that if the temperature detected by all the temperature detecting means of the plurality of temperature detecting means correspond to the temperature conditions of a stage at a level lower than the temperature rise suppressing measure of the current stage, the measure selecting means selects the temperature rise suppressing measure at a lower level from the current stage, then the temperature rise suppressing measure can be lightened when the internal temperature becomes appropriate to increase the performance of the equipment, so it is excellent in the point that an integrated temperature control including a plurality of measuring locations can be performed.

Further, it can be characterized in that a plurality of types of battery packs can be attached to the system unit, and from the measure selecting means, a temperature rise suppressing measure is selected under a different temperature condition for each type of attached battery pack. Furthermore, it can be characterized in that the measure selecting means is provided in the battery pack, and transmitting means is further provided for transmitting information on the temperature rise suppressing measure selected by the measure selecting means to the system unit from the battery pack. This construction is preferred in the point that an appropriate thermal action can be taken without considering the differences among battery packs. Moreover, as to the surface temperature of the battery pack, the required maximum temperature depends on whether the battery pack is exposed on the main equipment to form the outer wall thereof or it is housed in the system unit, and the present invention is excellent in the point that the differences by the types of batteries can be handled, and the system unit controller need not discriminate among the types of batteries.

In a further aspect, the present invention is a method for controlling the temperature of a battery which is attached to a computer system, characterized by setting different temperature conditions as criteria for temperature rise determination for a plurality of locations in the battery, presetting the relations between the temperature conditions to be set and the stepwise temperature rise suppressing measures of lower to higher levels which are implemented by the computer system, detecting the temperatures at the plurality of locations in the battery, and selecting the temperature rise suppressing measure at the highest stage among the temperature conditions to which the detected temperatures at the plurality of locations are corresponding, respectively. It can be characterized in that the plurality of locations for which temperature conditions are selected include the proximity of the surface of the battery and/or the proximity of a protection circuit, and also can be characterized in that the relations between the temperature conditions and the temperature rise suppressing measures are preset by table information.

BRIEF DESCRIPTION OF THE DRAWINGS

FIG. 5 is a figure showing an example of a thermal table used for determining a temperature rise suppressing measure;

FIGS. 7(a) and 7(b) are diagrams for explaining a structure of an FET as a protection circuit.

PROBLEMS TO BE SOLVED BY THE INVENTION

However, an FET is generally expensive, and providing a plurality of FETs respectively leads to an increase in the costs of the whole apparatus and the battery pack. It is not reasonable to allow the cost increase for the measure against the temperature rise in the battery pack.

Further, for instance, in a notebook PC, the user (customer) may operate the equipment while holding it on his/her lap. Generally, it is often the case that the operation panel such as a keyboard is arranged on the upper surface of the equipment, while the battery pack is arranged on the bottom surface of the equipment. With this arrangement, if the temperature of the battery pack close to the user's lap becomes high, the user feels discomfort. For this, it is needed to fully suppress the rise of the temperature (surface temperature) in the portion close to the surface in contact with the user.

Further, for instance, in a notebook PC, a plurality of battery packs can be provided to the user according to the types of batteries and the vendors of batteries. For each type of battery pack, the temperature of the battery cell, the temperature of the protection circuit, and the surface temperature of the battery pack have different criteria. In the prior art, however, the detected temperature data of the battery cell was directly sent to the system unit, and it was difficult to perform fine control according to the characteristics of the battery cell, though the battery cell could be kept at a specified temperature or lower. In addition, the surface temperature of the battery pack and the heat generation in the protection circuit could not accurately be controlled as well.

The present invention was achieved to solve the above technical problems, and its object is not only to control the temperature of the battery cell but to control the temperature of the protection circuit and/or the surface temperature of the battery pack at a specified temperature or lower.

A further object is to enable a simple temperature control by the system without considering any specified temperature of each battery portion and the difference among battery packs.

DETAILED DESCRIPTION OF THE PREFERRED EMBODIMENT

Now, the present invention will be described in detail according to the embodiment shown in the accompanying drawings.

Figure 1:
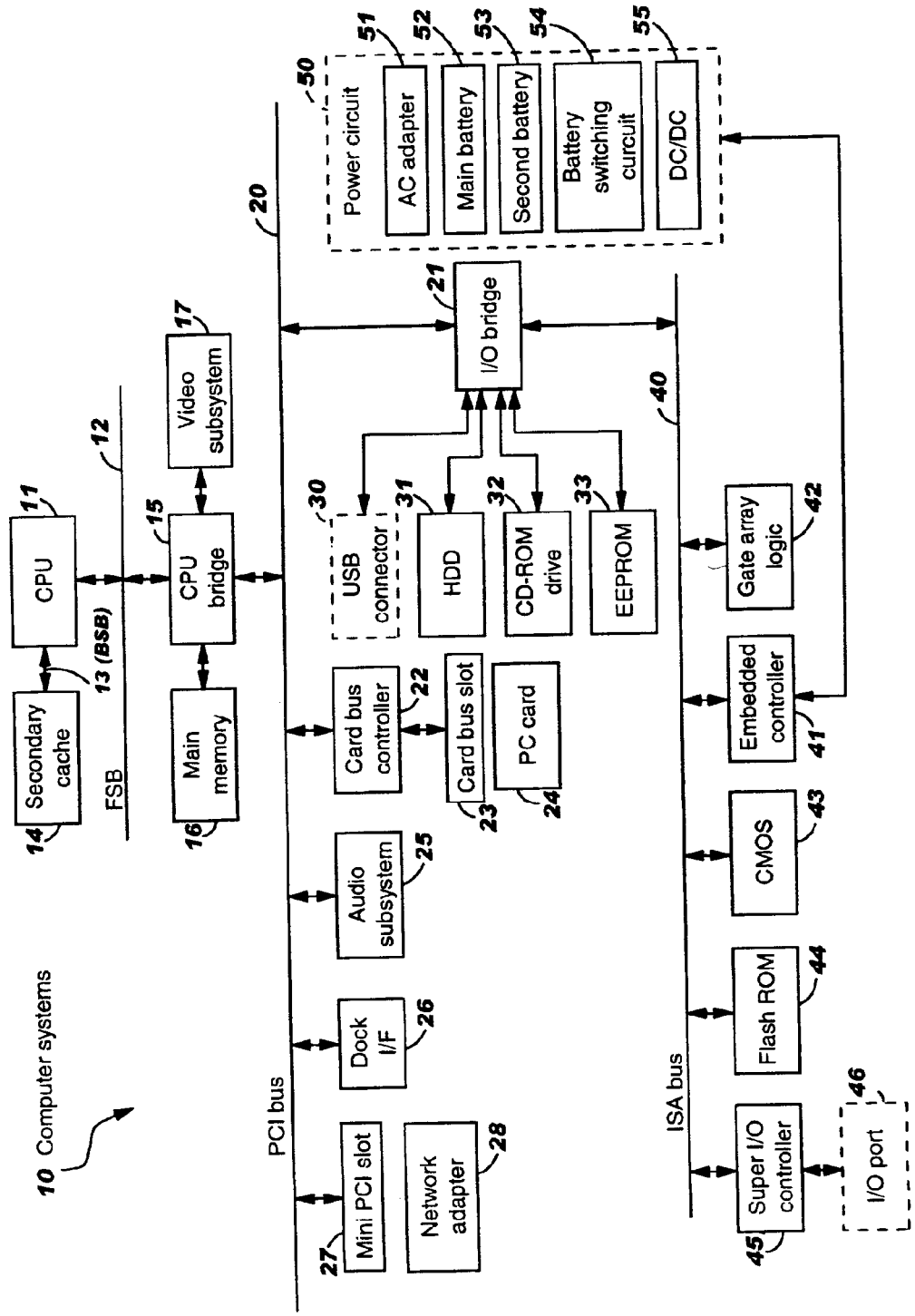
FIG. 1 is a diagram showing a hardware configuration of a computer system 10 equipped with a battery pack to which the present embodiment is applied.

FIG. 1 is a diagram showing the hardware configuration of a computer system 10 including a battery pack, to which the embodiment of the present invention is applied. The PC (personal computer) to which the embodiment of the present invention is applied is constructed, for instance, as a notebook PC (notebook-sized personal computer) which is based on the OADG (PC Open Architecture Developer's Group) specification, and has a predetermined OS (operating system).

Figure 2:
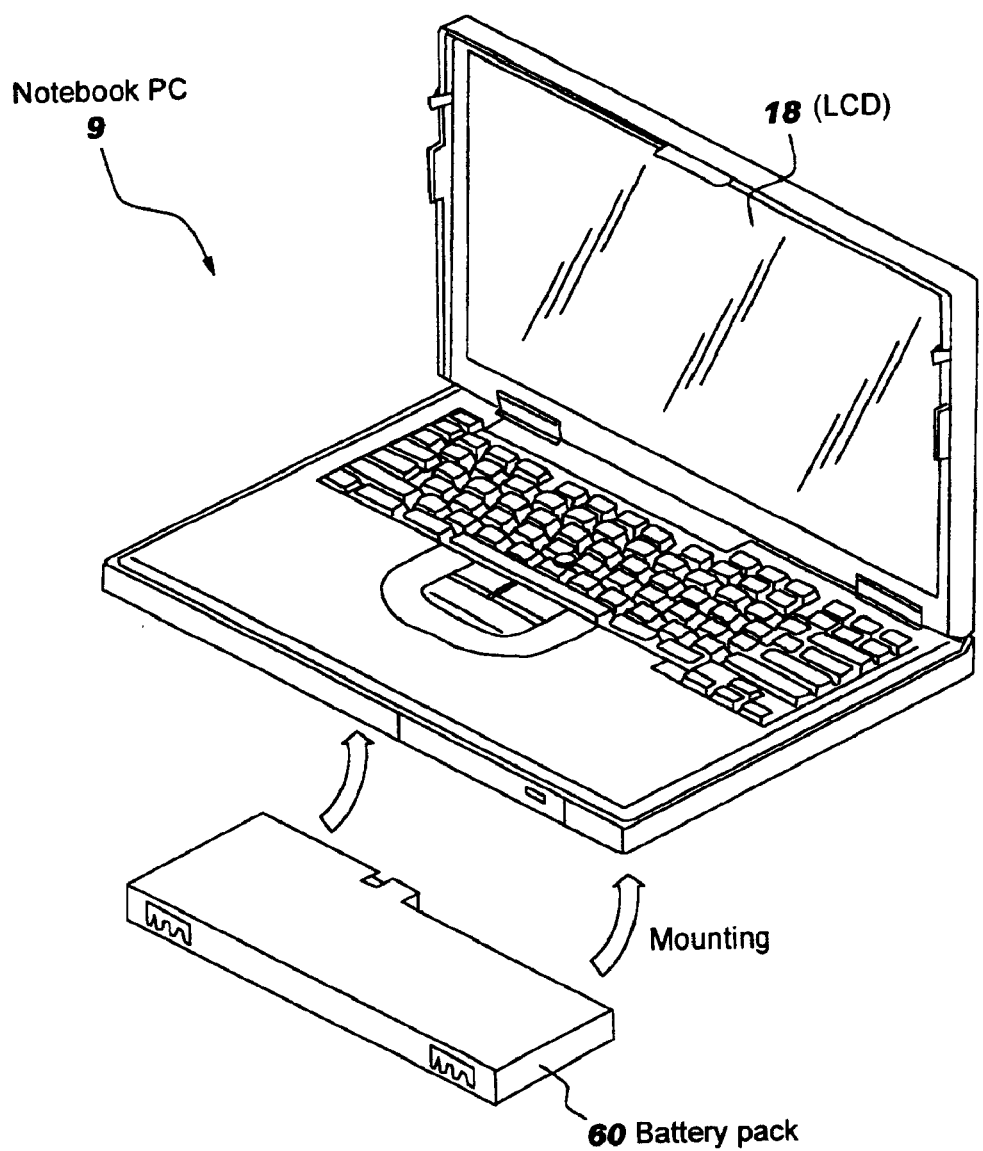
FIG. 2 is a perspective view showing a notebook PC 9 to which the present embodiment is applied.

Further, FIG. 2 is a perspective view showing a notebook PC 9 to which the embodiment of the present invention is applied. In the notebook PC 9, the computer system 10 shown in FIG. 1 is included, and a liquid crystal display (LCD) 18 is provided. Furthermore, in the bottom of the notebook PC 9, a battery pack 60 to which the embodiment of the present invention is applied is mounted.

In the computer system 10 shown in FIG. 1, a CPU 11 functions as the brain of the whole computer system 10, and executes various programs under the control of the OS. The CPU 11 is interconnected to the various components through three levels of buses: an FSB (Front Side Bus) 12 which is a system bus, a PCI (Peripheral Component Interconnect) bus 20 as a bus for high-speed I/O devices, and an ISA (Industry Standard Architecture) bus 40 as a bus for low-speed I/O devices. The CPU 11 employs a cache memory for storing a part of the contents of the main memory, for instance, in an SRAM, and stores program codes and data in the cache memory to accelerate the processing.

Recently, an SRAM of about 128 Kbytes is integrated in the CPU 11 as a primary cache, a secondary cache 14, an external cache, of the order of 512K to 2 Mbytes is provided through a BSB (Back Side Bus) 13, a special-purpose bus, to supplement the lack of capacity. In addition, the cost may be lowered by omitting the BSB 13 and connecting the secondary cache 14 to the FSB 12 to avoid a package having many terminals.

The FSB 12 and the PCI bus 20 are interconnected by a CPU bridge (host-PCI bridge) 15 called a memory/PCI chip. The CPU bridge 15 comprises a memory controller function for controlling the accessing to a main memory 16, data buffer for absorbing the difference in data transfer speed between the FSB 12 and the PCI bus 20, or the like. The main memory 16 is a writable memory, which is used as an area into which the execution program of the CPU 11 is read, or a work area to which the processing data of the execution program is written. For instance, if is constructed of a plurality of DRAM chips, equipped with, for instance, 64 MB as standard, and can be extended, for instance, to 320 MB. The execution program includes various drivers for hardware operation of the OS and peripheral equipment, application programs directed to specific applications, and firmware such as BIOS (Basic Input/Output System) stored in a flash ROM 44 to be described later.

A video subsystem 17 is a subsystem for implementing functions related to video, and it includes a video controller. The video controller processes drawing instructions from the CPU 11, writes the processed drawing information to a video memory, and reads the drawing information from the video memory and outputs it to the liquid crystal display (LCD) 18 shown in FIG. 2 as drawing data.

The PCI bus 20 is a bus allowing relatively high speed data transfer, and it is standardized by a specification in which the data bus width is 32 bits or 64 bits, the maximum operation frequency is 33 MHz, 66 MHz, or 100 MHz, and the maximum data transfer speed is 133 MB/sec, or 533 MB/sec. Connected to the PCI bus 20 are I/O bridge 21, a card bus controller 22, an audio subsystem 25, a docking station interface (Dock I/F) 26, and a mini PCI slot 27, respectively.

The card bus controller 22 is a special-purpose controller for directly connecting the bus signal of the PCI bus 20 to the interface connector (card bus) of the card bus slot 23, and a PC card 24 can be loaded in the card bus slot 23. The docking station interface 26 is hardware for connecting a docking station (not shown), which is the expansion unit for the notebook PC 9. When the notebook PC 9 is set on the docking station, various hardware elements connected to the internal bus of the docking station are connected to the PCI bus 20 through the docking station interface 26. Further, to the mini PCI slot 27, for instance, a network adapter 28 is connected for connecting the computer system 10 to a network.

The I/O bridge 21 has a function of bridge between the PCI bus 20 and the ISA bus 40. Further, it includes a DMA controller function, a programmable interruption controller (PIC) function, a programmable interval timer (PIT) function, an IDE (Integrated Device Electronics) interface function, a USB (Universal Serial bus) function, an SMB (System Management Bus) interface function, and a real time clock (RTC).

The DMA controller function is to execute data transfer between peripheral equipment (for instance, FDD (floppy disk drive) and the main memory 16 without the mediation of the CPU 11. The PCI function is to respond to an interruption request (IRQ) from peripheral equipment for executing a predetermined program (interruption handler). The PIT function is to generate a timer signal in a predetermined cycle, and the generation cycle is programmable. Further, as to the interface implemented by the IDE interface function, an IDE hard disk drive (HDD) 31 is connected, and a CD-ROM drive 32 is connected by ATAPI (At Attachment Packet Interface). Instead of the CD-ROM drive 32, an IDE device of another type like a DVD (Digital Versatile Disk) drive may be connected. External storage devices such as the HDD 31 and CD-ROM drive 32 are stored in a storage location called a "media bay" or "device bay" in the system unit. These standard external storage devices may be interchangeably or exclusively provided between other equipment such as the FDD or battery pack 60.

Further, a USB port is provided in the I/O bridge 21, and the USB port is connected to a USB connector 30 provided, for instance, in the wall surface of the system unit of the notebook PC 9. Further, to the I/O bridge 21, an EEPROM 33 is connected via an SM bus. The EEPROM 33 is a memory for holding information such as the password or supervisor password registered by the user, and the product serial number, and it is nonvolatile and electrically rewritable in the contents.

The ISA bus 40 is a bus having a data transfer speed lower than the PCI bus 20 (for instance, the bus width is 16 bits and the maximum data transfer speed is 4 MB/sec). Connected to the ISA bus 40 are an embedded controller 41 connected to a gate array logic 42, a CMOS 43, a flash ROM 44, and super I/O controller 45. Further, it is also used to connect a peripheral device operating at a relatively low speed, such as a keyboard/mouse controller (not shown). An I/O port 46 is connected to the super I/O controller 45, and controls the driving of the FDD, the input/output of parallel data (PIO) through a parallel port, and the input/output of serial data (SIO) through a serial port.

The embedded controller 41 performs the control of a keyboard, not shown, and connected to a power circuit 50, taking charge of part of the power management function by the built-in power management controller (PMC) in cooperation with the gate array logic 42. In this embodiment, the action level (temperature rise suppressing measure) of the computer system 10 is controlled by the command sent from the power circuit 50.

The power circuit 50 includes circuits such as an AC adapter 51, a battery switching circuit 54 for charging a main battery 52 as the battery (secondary battery) or a second battery 53 and switching the power supply path from the AC adapter 51 and each battery, and a DC/DC converter (DC/DC) 55 for generating D.C. voltages of 5 V, 3.3 V or the like used in the computer system 10. The main battery 52 or the second battery 53 is mounted on the computer system 10 as the battery pack 60 in this embodiment. The main battery 52 is formed by serially connecting, for instance, a plurality of lithium-ion batteries. Further, the second battery 53 is comprised, for instance, of a lithium-polymer battery, and it is separately attached to the external portion of the notebook PC 9 and connected to the computer system 10, for instance, it is inserted after removing the FDD or CD-ROM drive 32 of the notebook PC 9.

Figure 3:
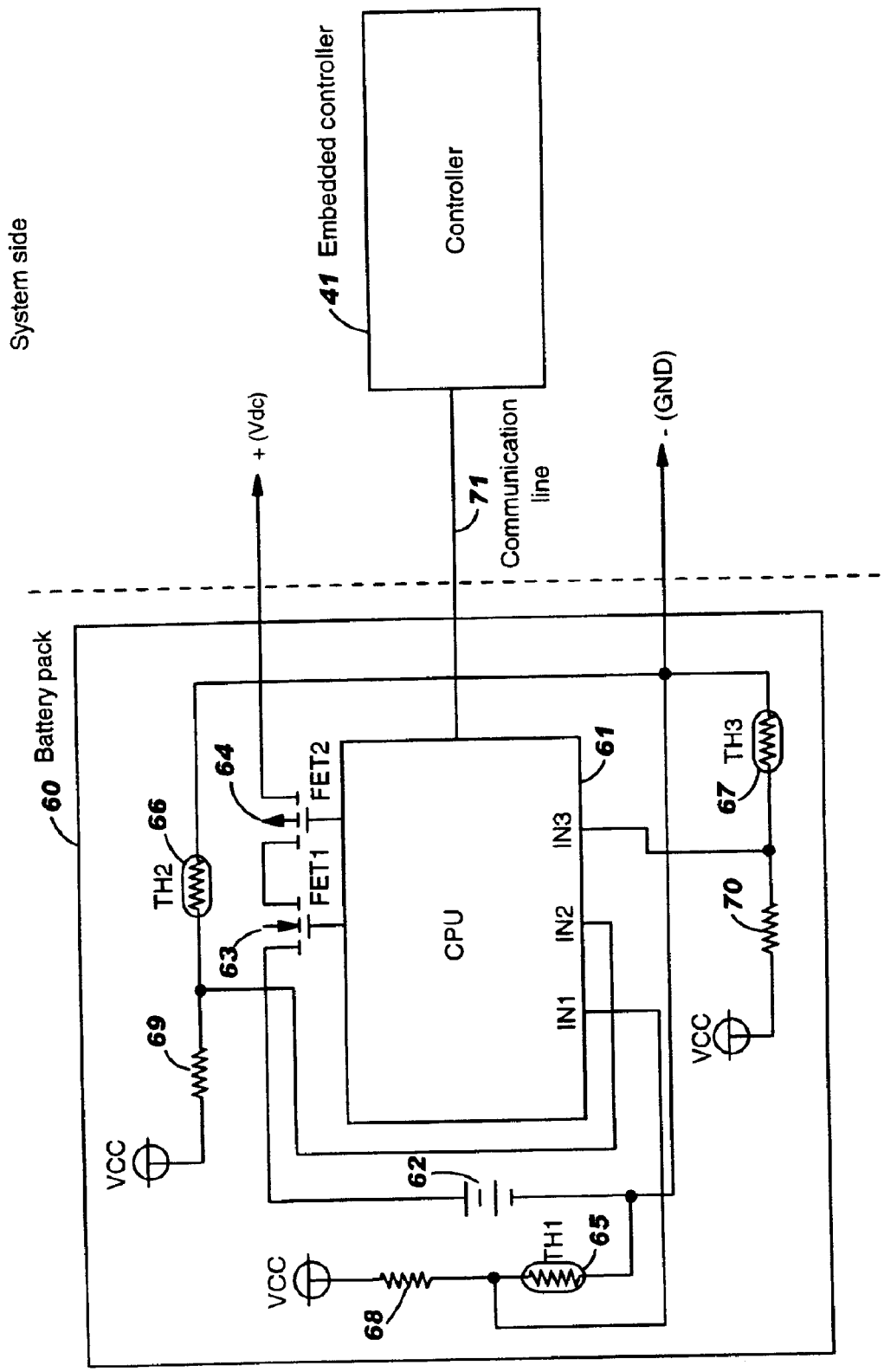
FIG. 3 is a diagram for explaining a circuit construction to which an integrated temperature control, which is the present embodiment is applied.

FIG. 3 is a diagram for explaining the circuit construction, to which an integrated temperature control that is this embodiment is applied. The battery pack 60 shown in FIG. 3 is used as the main battery 52 or the second battery 53 shown in FIG. 1. The battery pack 60 includes a CPU 61 for controlling itself as an intelligent battery, a battery cell 62 which is a lithium-ion battery or lithium-polymer battery, a first FET (FET1) 63 and a second FET (FET2) 64 which functions as protection circuits for charging and discharging, respectively. A communication line 71 is formed between the CPU 61 the embedded controller 41. Further, there are included a first thermistor (TH1) 65 provided in proximity to the battery cell 62 and having a resistance value which changes as temperature rises, a second thermistor (TH2) 66 provided in proximity to the first FET 63 and the second FET 64, protection circuits, and having resistance value which changes as temperature rises, and a third thermistor (TH3) 67 provided in proximity to the surface of the battery pack 60 and having a resistance value which changes as temperature rises. Further, there are included a first resistor 68, a second resistor 69, and a third resistor 70, which enables the detection of the respective temperatures by the resistance ratios to the first thermistor 65, second thermistor 66, and third thermistor 67.

The CPU 61 recognizes the value of the current flowing into the battery cell 62 and the value of the current flowing out from the battery cell 62 to control ON/OFF of the first FET 63 and the second FET 64. Further, it performs communication between the embedded controller 41, for instance, by detecting the capacity of the battery cell 62 to inform the embedded controller 41 of it through the communication line 71. Further, in this embodiment, it has the functions of detecting temperatures by the first thermistor 65, the second thermistor 66, and the third thermistor 67, determining the action level of the system side (computer system 10 side) by the detected temperatures, and communicating the determined action level to the embedded controller 41 through the communication line 71.

The first FET 63 and the second FET 64, which are protection circuits, are separately arranged for discharge stop and charge stop functions in a manner similar to the discharge stop FET 201 and the charge stop FET 202 shown in FIG. 7(*a*), and for instance, the first FET 63 can be set for discharge stop and the second FET 64 can be set for charge stop. Further, it is possible to select either of a P-channel semiconductor in which the channel is a P-type semiconductor, or an N-channel semiconductor in which the channel is an N-type semiconductor, respectively. These FETs are turned on/off by controlling the movement of the majority carrier by the electric field generated by an applied voltage, and have high input impedance, enabling the simplification of the construction when forming transistors on an IC. At present, the MOS (Metal Oxide semiconductor) type using only the field effect by employing an insulator is often used.

When power is supplied, for instance, an output voltage of about 1.6 V is supplied to the CPU 11 from the battery pack 60, but, recently the load power of the CPU 11 tends to increase, and in the running of a special program causing the CPU 11 to run at high speed, for instance, the temperature rise in the first FET 63 or the second FET 64, a protection circuit, may exceed the absolute rated temperature, resulting in the destroying of the FET. Further, the temperature of the surface of the battery pack 60 which is in contact with the user becomes high as the internal temperature of the battery pack 60 rises. For instance, if the temperature of the notebook PC 9 rises when the user places the notebook PC 9 on his/her lap, the user would feel discomfort. Thus, this embodiment is constructed so that these temperature rises can be detected by the first thermistor 65, the second thermistor 66, and the third thermistor 67. As the first thermistor 65, the second thermistor 66, and the third thermistor 67, there are a NTC (Negative Temperature Coefficient) thermistor the resistance value of which decreases in response to temperature rise, a PTC (Positive Temperature Coefficient) thermistor the resistance value of which increases in response to temperature rise, or a CTR (Critical Temperature Resistor) the resistance value of which rapidly changes in a specific temperature region, and according to the respective characteristics, a desired thermistor can be selected.

Figure 4:
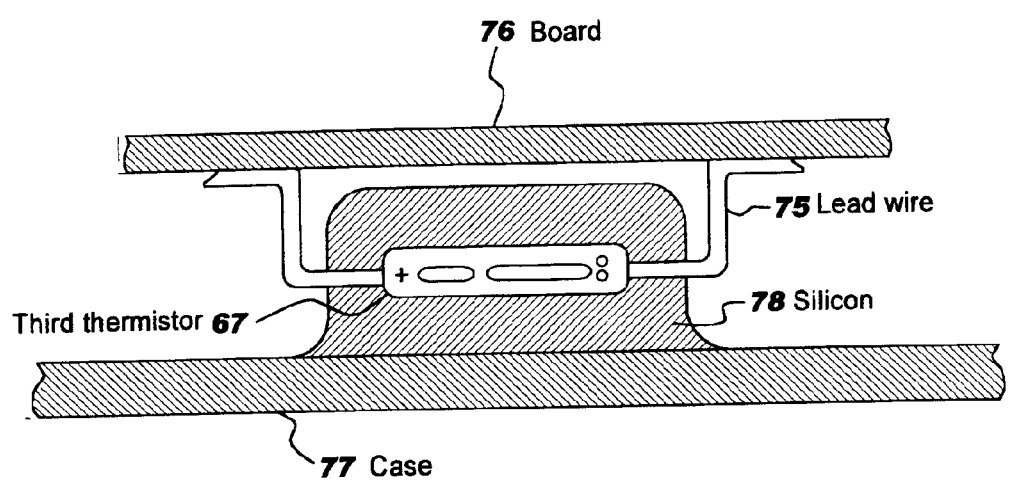
FIG. 4 is a conceptual view for explaining a condition in which a third thermistor 67 is mounted.

FIG. 4 is a conceptual view for explaining the mounting state of the third thermistor 67. A case 77 shown in the FIG. 4 is on the assumption that the battery pack 60 forms a part of the outer wall of the notebook PC 9 when attached to the bottom of the system unit of the notebook PC 9. In this embodiment, the third thermistor 67 provided in a board 76 is made to extend from the board 76 to the case 77 of the battery pack 60 by the lead wires 75 of the third thermistor 67 so as to be disposed in contact with or close to the case 77. Thereafter, silicon 78 is used to fix the third thermistor 67. The location at which the third thermistor 67 is fixed is preferably selected by detecting the temperature distribution of the surface temperature of the battery pack 60 using, for instance, a thermo-viewer, and selecting the portion showing the highest surface temperature from the detected temperature distribution.

The temperature in proximity to the battery cell 62, the temperature in proximity to the first FET 63 and the second FET 64, and the surface temperature of the battery pack 60 are converted to voltages according to the resistance value changes in the first thermistor 65, the second thermistor 66, and the third thermistor 67, respectively, and input to the ports (IN1, IN2, IN3) of the CPU 61. Inside the CPU 61 are provided an A/D converter, converting the voltages to digital temperature data. The converted data is compared with the internal thermal table (described later) to determine the action level (temperature rise suppressing measure) in the computer system 10, which is sent to the embedded controller 41.

FIG. 5 is a figure showing an example of the thermal table used for determining the temperature rise suppressing measure. In this embodiment, such thermal table as shown in FIG. 5 is included in the CPU 61, and in this example, it is constructed so that 6 action levels (temperature rise suppressing measures) from thermal level 0 to thermal level 5 can be determined. This embodiment is characterized in that not only the temperature rise in the battery cell 62 is detected by the TH1 (first thermistor 65) and controlled, but also temperature rise is detected for other portions causing problems with temperature rise to determine an action item. That is, temperature data in a plurality of locations is obtained and compared with the thermal table as shown in FIG. 5 to determine an action item, and the determined action item is sent to the embedded controller 41. This allows a predetermined action item to be determined by grasping the conditions according to a portion having a temperature rise problem.

In the thermal table shown in FIG. 5, "enable" of thermal levels 0 to 5 for each location indicates the temperature at which each state is entered, and "disable" for each location indicates the temperature at which the state is released. The thermal level 0 represents a normal action, and the respective temperatures of TH1 (first thermistor 65), TH2 (second thermistor 66), and TH3 (third thermistor 67) are not applied to the execution and stop by temperature rise. At the thermal level 1, the temperature of the battery pack 60 is decreased by rotating a cooling fan, not shown, provided in the neighborhood of the battery pack 60. For instance, for temperature rise, it is determined that the fan rotates when the TH1 (first thermistor 65) reaches (rises to) 50° C., and conversely, for temperature decrease, it is determined that the fan stops its rotation when the TH1 reaches (lowers to) 40° C. At the thermal level 2, the load power is reduced by clock-down of the CPU 11 (reduction of the clock frequency) to suppress the heating in the battery pack 60.

Further, at the thermal level 3, the operation of the CPU 11 is controlled so as to perform throttling (intermittent operation). At the thermal level 4, the computer system 10 is put in a suspend state, and temporarily halted while keeping the execution state of a program, with power being supplied only to the minimum hardware required for holding data. Further, at the thermal level 5, the computer system 10 is powered off, and the power supply from the battery pack 60, which causes a temperature rise, is cut.

Figure 6:
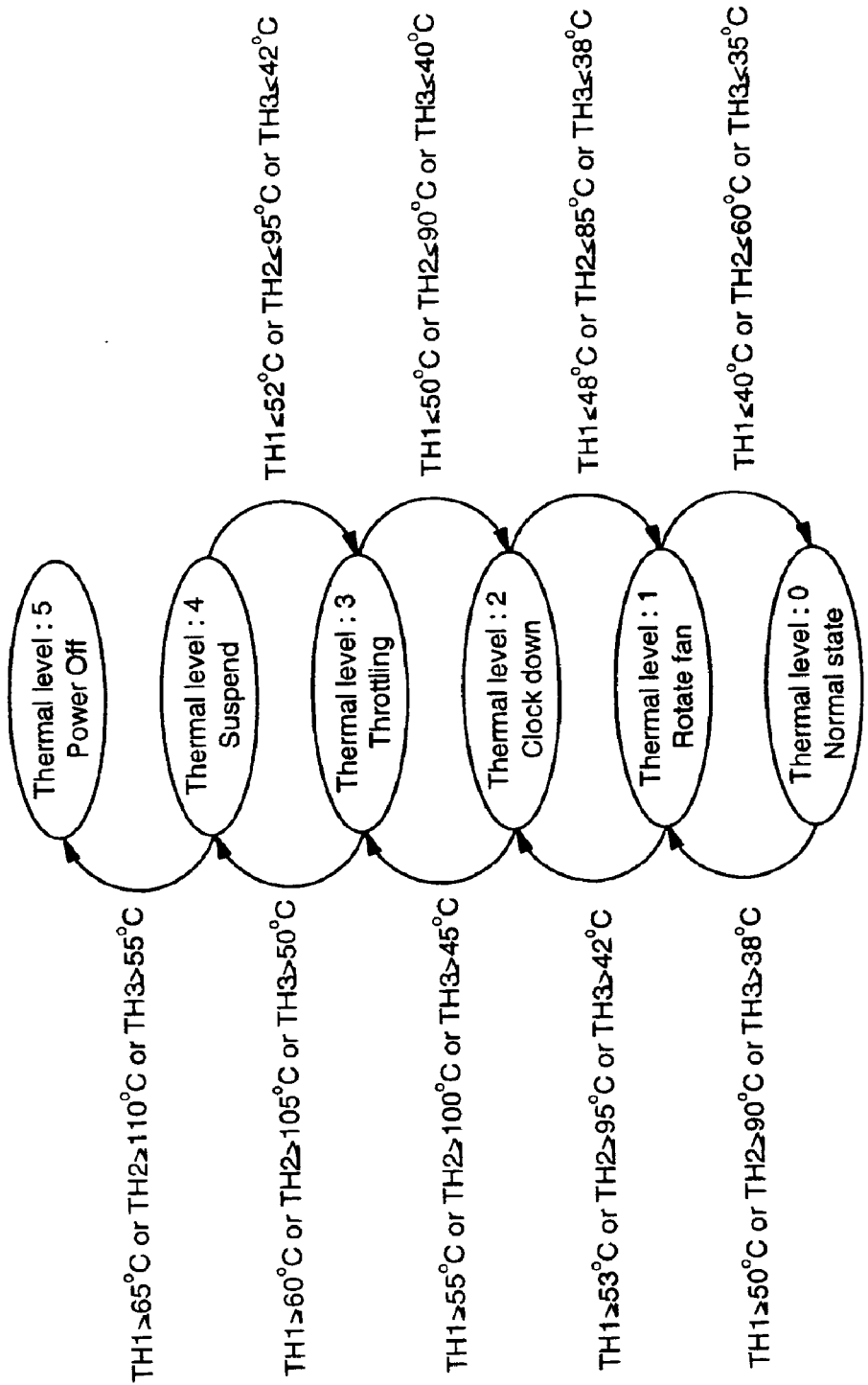
FIG. 6 is a diagram showing action items determined from the thermal table shown in FIG. 5 by state transition of a computer system 10.

FIG. 6 is a diagram showing the action items determined from the thermal table shown in FIG. 5 by the state transition of the computer system 10. First, the computer system 10 in the normal state at the thermal level 0 transitions to the thermal level 1 for rotating the fan if any one of the conditions of the TH1 being equal to or higher than 50° C., the TH2 being equal to or higher than 90° C., and the TH3 being equal to or higher than 38° C. is satisfied. From the thermal level 1, a transition to the normal state at the thermal level 0 is effected if all the conditions of the TH1 being equal to or lower than 40° C., the TH2 being equal to or lower than 60° C., and TH3 being equal to or lower than 35° C. are satisfied. Further, a transition from the state of the thermal level 1 to the state of the thermal level 2 is effected if the TH1 becomes 53° C. or higher, or the TH2 becomes 95° C. or higher, or the TH3 becomes 42° C. or higher. If the TH1 becomes 48° C. or lower and the TH2 becomes 85° C. or lower and the TH3 becomes 38° C. or lower, the state of the thermal level 2 is released to cause a transition to the state of the thermal level 1.

Similarly, a transition is caused from the thermal level 2 to the thermal level 3 if the TH1 is equal to or higher than 55° C. or the TH2 is equal to or higher than 100° C. or the TH3 is equal to or higher than 45° C., and from the thermal level 3 to the thermal level 4 if the TH1 is equal to or higher than 60° C. or the TH2 is equal to or higher than 105° C. or the TH3 is equal to or higher than 50° C., and from the thermal level 4 to the thermal level 5 if the TH1 is equal to or higher than 65° C. or the TH2 is equal to or higher than 110° C. or the TH3 is equal to or higher than 55° C., thereby for suppressing the temperature rise in the battery pack 60. Further, similarly, a transition is effected from the thermal level 4 to the thermal level 3 if the TH1 is equal to or lower than 52° C. and the TH2 is equal to or lower than 95° C. and the TH3 is equal to or lower than 42° C., and from the thermal level 3 to the thermal level 2 if the TH1 is equal to or lower than 50° C. and the TH2 is equal to or lower than 50° C. and the TH3 is equal to or lower than 40° C.

Further, explanation is made to a more specific example. Now, it is assumed that the TH1 (first thermistor 65) for the surface temperature of the battery cell 62 increases to 45° C., the TH2 (second thermistor 66) for the surrounding temperature of the protection circuit (first FET 63 and second FET 64) increases to 100° C., and the TH3 (third thermistor 67) for the surface temperature of the battery pack 60 increases to 42° C. In this example, it is not needed to take an action because the TH1 has not reached 50° C., a condition for transition to the thermal level 1. Since the TH2 is equal to or higher than 100° C., an action for the thermal level 3 is needed. Since the TH3 is equal to or higher than 42° C., an action for the thermal level 2 is needed. As a result, the surrounding temperature of the protection circuit (first FET 63 and the second FET 64), detected in the TH2 (second thermistor 66) is in the worst condition in the battery pack 60, the throttling action at the thermal level 3 is required to eliminate this temperature rise trouble. Then, after making such determination, the CPU 61 of the battery pack 60 requests the embedded controller 41 through the communication line 71 for the system unit of the computer system 10 to take the throttling action at the thermal level 3.

The embedded controller 41 having received such request presents the request to the CPU 11, which carries out the throttling operation. When the CPU 11 performs the throttling operation, the power consumption of the computer system 10 decreases. As a result, the current flowing through the protection circuit (first FET 63 and second FET 64) decreases, and the power loss caused in the protection circuit decreases and the temperature of the TH2 (second thermistor 66) lowers. If the temperature of the TH2 (second thermistor 66) lowers to 90° C. and the TH3 (third thermistor 67) is equal to or lower than 40° C. at this point, the CPU 61 of the battery pack 60 requests the embedded controller 41 for releasing the throttling action at the thermal level 3 to request a transition to the state of thermal level 2, clock-down. In the system unit of the computer system 10 having received this request, the clock-down operation is carried out.

The allowed maximum temperature of the battery cell 62 depends on the battery type, and the maximum temperature of the protection circuit (first FET 63 and second FET 64) depends on the rated temperatures of the parts used. Further, the surface temperature of the battery pack 60 also has a different required maximum temperature, depending on whether the battery pack 60 is exposed on the surface of the system unit equipment or accommodated in the system unit. In accordance with this embodiment, by including the thermal table as shown in FIG. 5 within the battery pack 60, namely, by determining an item of action in the battery pack 60, difference by the battery type and difference in the specification by makers or vendors can be absorbed. Accordingly, in the system unit side of the computer system 10, it is not required to discriminate the type of the battery attached as the battery pack 60, and the problem with temperature rise can be solved only by implementing a thermal action according to the received thermal level.

In addition, the information conveyed from the CPU 61 of the battery pack 60 to the embedded controller 41 through the communication line 71 may be a direct action item in the computer system 10 or only information on a thermal level. In such case, it is only needed to determine the action item corresponding to the thermal level on the embedded controller 41 side that received the information on the thermal level. Further, if the battery type or the like can be recognized or only a specific battery is used, a construction may be provided in which table information such as shown in FIG. 5 is included on the embedded controller 41 side. Even in this construction, as compared with the prior art in which only the surface temperature data of the battery cell 62 is detected, in this embodiment, an action item can be determined after adding the surrounding temperature data of the protection circuit (first FET 63 and second FET 64) and the surface temperature data of the battery pack 60, enabling user discomfort to be eliminated and the safety of the notebook PC 9 to be obtained more effectively. Furthermore, this embodiment can be developed so that the temperature rise detection is expanded to other portions which may cause problems, and the action level of the computer system 10 is determined considering all of these data.

Further, in this embodiment, the description has been made by taking as an example the notebook PC 9 as a representative of the computer system or portable electric equipment. However, it is not always limited to the notebook PC 9, it can be modified so as to be applied to various equipment to which a battery such as the battery pack 60 is attached when used, for instance, various mobile equipment, or handy AV (Audio Visual) equipment. However, for instance, the notebook PC 9 could conceivably be operated on the user's lap, a measure for reducing the user discomfort by increase in the outer wall temperature would be highly demanded.

Advantages of the Invention

In accordance with the forgoing, with the present invention provides not only the temperature control of the battery cell, but also of the protection circuit using incremental reduction strategies and parallel current control devices.

The invention have been described in detail with references to preferred implementations thereof, but it should be appreciated that alternatives for implementation will be suggested to those skilled in the art which are within the scope of the invention as claimed.

What is claimed:

1. A battery connected to a computer system for supplying power to said computer system, comprising:
   a first sensor provided at a first location in said battery for detecting temperature;
   a second sensor provided at a second location different from said first location in said battery for detecting temperatures; and
   a CPU for outputting information on respective actions to be implemented by said computer system to said computer system according to respective temperatures detected by the respective sensor, wherein a first action is taken at least part of the time based only on the first sensor indicating a first temperature, the first action also being taken at least part of the time based only on the second sensor indicating a second temperature different than the first temperature.

2. The battery according to claim 1, wherein said CPU selects a predetermined state from a plurality of states to which said computer system can transition, according to the respective temperatures obtained by said first sensor and said second sensor, and outputs information on said selected predetermined state to said computer system.

3. The battery according to claim 1, wherein the first sensor is provided at a location in proximity to a protection circuit for preventing an overcurrent and the second sensor is provided a location in proximity to the surface of a cover housing said battery.

4. The battery according to claim 1, wherein the action to be implemented by said computer system is selected based on temperature levels indicated by said sensors from a plurality of measures including decreasing the clock frequency of the system unit CPU in the computer system, intermittently operating said system unit CPU, a suspend CPU operation, and turning off the power completely.

5. A battery pack which is attached to an electric equipment, comprising:
   a cover forming a part of the outer wall of said electric equipment when said battery pack is attached to said electric equipment;
   an outer wall sensor for detecting the temperature in proximity to a predetermined location on said cover;
   a memory for storing predetermined relations between the temperatures detected by said outer wall sensor and a plurality of temperature rise suppressing measures;
   a process determination logic for determining a temperature rise suppressing measure from the temperature detected from said out wall sensor, according to the relations stored in said memory;
   an output logic for outputting to said electric equipment commands for initiating the temperature rise suppressing actions determined by said process determination logic; and
   an internal temperature detecting sensor for detecting the temperature at a predetermined location in said battery pack, wherein at least a first action condition when a first temperature is detected by said internal temperature detecting sensor is different from at least a second action condition when the first temperature is detected by said outer wall sensor.

6. The battery pack according to claim 5, wherein said predetermined location for which temperature is detected by said internal temperature detecting sensor is a protection circuit.

7. A computer system constructed so that a battery pack for power supply can be attached to the system unit thereof, wherein said battery pack comprises:
   a cover forming a part of the outer wall in said computer system when said battery pack is attached to said computer system;
   a first temperature detector for detecting the temperature in proximity to a predetermined location on said cover forming a part of said outer wall;
   at least one second temperature detector;
   an operation level selector for selecting a level of operation in said computer system according to the temperature detected by at least one of said temperature detectors; and,
   a transmitter for transmitting information on the level of operation selected by said operation level selector to said system unit, and
   said system unit operates according to said information transmitted from said battery pack, wherein a first action is taken when the first detector indicates a first temperature and it not taken when the second detector indicates the first temperature, the first action also being taken when the second detector indicates a second temperature different than the first temperature.

8. The computer system according to claim 7, wherein said system unit includes a CPU which functions as a brain of said computer system, and said operation level selector in said battery pack selects a first state for decreasing the clock frequency of said CPU and a second state for intermittently operating said CPU as said level of operation.

9. An electric apparatus constructed so that a battery pack for power supply can be attached to the system unit thereof, comprising:
   a plurality of temperature detectors provided for a plurality of locations in said battery pack;
   a measure selector for selecting respective temperature rise suppressing measures according to respective temperatures detected by respective temperature detectors;
   wherein said measure selector determines stepwise temperature rise suppressing measures of lower to higher levels according to the temperature condition of each of the temperatures detected by said plurality of temperature detectors, and if the temperature detected by at least one temperature detector of said plurality of temperature detectors corresponds to the temperature conditions of a stage at a level higher than the temperature rise suppressing measure of the current stage, it selects the temperature rise suppressing measure of said stage corresponding to said temperature condition; and
   a suppressing measure implementing logic for implementing the temperature rise suppressing measure selected by said measure selector.

10. The electric apparatus according to claim 9, wherein said measure selector selects any two or more of a measure for decreasing the clock frequency of the CPU in said system unit, a measure for intermittently operating said CPU, a suspend measure in the system unit, and a power-down measure as stepwise temperature rise suppressing measures.

11. The electric apparatus according to claim 10, wherein if the temperature detected by all the temperature detectors of said plurality of temperature detectors correspond to the temperature conditions of a stage at a level lower than the temperature rise suppressing measure of the current stage, said measure selector selects the temperature rise suppressing measure at the lower level from the current stage.

12. The electric apparatus according to claim 10, wherein a plurality of types of battery packs can be attached to said system unit, and from said measure selector, a temperature rise suppressing measure is selected under a different temperature condition for each type of attached battery pack.

13. The electric apparatus according to claim 10, wherein said measure selector is provided in said battery pack, and said electric equipment further includes a transmitter for transmitting information on the temperature rise suppressing measure selected by said measure selector to said system unit from said battery pack.

* * * * *